(12) United States Patent
Yang et al.

(10) Patent No.: US 9,064,343 B2
(45) Date of Patent: Jun. 23, 2015

(54) GRAPHICS PROCESSING USING TWO-DIMENSIONAL SCISSOR REGIONS

(75) Inventors: Ruiduo Yang, San Diego, CA (US); Linda Ip, San Diego, CA (US); Michael D. Street, San Diego, CA (US); Qing Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 803 days.

(21) Appl. No.: 12/861,890

(22) Filed: Aug. 24, 2010

(65) Prior Publication Data
US 2012/0050291 A1 Mar. 1, 2012

(51) Int. Cl.
| | | |
|---|---|---|
| G06T 15/10 | (2011.01) | |
| G06T 15/00 | (2011.01) | |
| G06T 1/20 | (2006.01) | |
| G06T 15/30 | (2011.01) | |

(52) U.S. Cl.
CPC ..................................... G06T 15/30 (2013.01)

(58) Field of Classification Search
CPC ..... G06T 15/005; G06T 15/30; G06T 15/405; G06T 1/60; G06T 2200/28; G06T 15/20; G06T 19/00; G06T 17/05; G06T 19/20; G06T 15/205; G06T 17/20; C12N 15/8241; A61H 2201/5046; A61H 2201/5012; H04N 21/6587; G06F 21/31
USPC ............................ 345/427, 419, 506; 382/173
See application file for complete search history.

(56) References Cited

U.S. PATENT DOCUMENTS

| | | | | |
|---|---|---|---|---|
| 5,835,096 A | * | 11/1998 | Baldwin | 345/582 |
| 6,650,331 B2 | | 11/2003 | Lindholm et al. | |
| 6,831,635 B2 | * | 12/2004 | Boyd et al. | 345/418 |
| 6,911,990 B2 | | 6/2005 | Selig et al. | |
| 7,586,495 B2 | | 9/2009 | Surti et al. | |
| 8,203,564 B2 | | 6/2012 | Jiao et al. | |
| 2008/0118148 A1 | * | 5/2008 | Jiao et al. | 382/173 |
| 2008/0198168 A1 | * | 8/2008 | Jiao et al. | 345/506 |
| 2008/0273033 A1 | | 11/2008 | Brennan | |
| 2011/0134123 A1 | * | 6/2011 | Salcolm et al. | 345/427 |

FOREIGN PATENT DOCUMENTS

| | | |
|---|---|---|
| EP | 1950706 A2 | 7/2008 |
| WO | 2008101210 | 8/2008 |

OTHER PUBLICATIONS cpn2000: Clipping in Open GL, Using the stencil buffer clipping, Version 10, Sep. 14, 1999, 7 pp.
Segal et al., "The Open GL® Graphics System: A Specification (Version DRAFT 4.1 (Compatibility Profile)—Jul. 25, 2010)," 678 pp.

(Continued)

*Primary Examiner* — Jason M Repko
*Assistant Examiner* — F. M. Hossain
(74) *Attorney, Agent, or Firm* — James R. Gambale, Jr.

(57) ABSTRACT

Aspects of this disclosure are directed to techniques to store values indicative of one or more scissor regions in a scissor buffer. In aspects of this disclosure, a processor may receive two dimensional (2-D) coordinates of a scissor region. The processor may transform the 2-D coordinates into coordinates that include more than two dimensions. The processor may store a value indicative of the scissor region in one or more storage units of the scissor buffer based on the coordinates that include more than two dimensions.

43 Claims, 5 Drawing Sheets

(56) References Cited

OTHER PUBLICATIONS

Segal et al., "The Open GL® Graphics System: A Specification (Version DRAFT 4.1 (Core Profile)—Jul. 25, 2010)," 518 pp.
Kessenich, "The Open GL® Shading Language," Language Version: 4.10, Document Revision 6, Jul. 24, 2010, 161 pp.
Segal et al., "The Open GL® Graphics System: A Specification (Version DRAFT 4.0 (Compatibility Profile)—Mar. 11, 2010)," 647 pp.
Segal et al., "The Open GL® Graphics System: A Specification (Version DRAFT 4.0 (Core Profile)—Mar. 11, 2010)," 489 pp.
Munshi et al., "Open GL® ES Common/Common-Lite Profile Specification Version 1.1.12 (Full Specification)," Apr. 24, 2008, 179 pp.
Munshi et al., "Open GL® ES Common Profile Specification Version 2.0.24 (Full Specification)" Apr. 22, 2009. 197 pp.
Rice et al.. "OpenVG Specification," Version 1.1, Dec. 3, 2008. 253 pp.
Kessenich, "The Open GL® Shading Language." Language Version: 4.10, Document Revision 2, Jun. 2, 2010, 160 pp.
Foley et al.,"Computer Graphics—Principles and Practice, second Edition in C",2003,Pearson Education, India, XP002667510,p. 71.
International Search Report and Written Opinion—PCT/US2011/049001—ISA/EPO—Feb. 6, 2012.
Jackie et al., "OPENGL Programming Guide—The Official Guide to Learning OPENGL,Version1.4", 2004,Addison-Wesley, Boston, XP002667509,p. 7-p. 9,p. 42-p. 43,p. 69-p. 70,p. 72 , p. 698-p. 700.
Mortensen EN et al.,"Interactive Segmentation with Intelligent Scissors",CVGIP Graphical Models and Image Processing , vol. 60,No. 5, Sep. 1, 1998,pp. 349-384,XP004418889, Academic Press, Duluth, MA, US ISSN:1077-3169,DOI:10.1006/GMIP.1998.0480 pp. 1-3;figures 16,17.

\* cited by examiner

GRAPHICS PROCESSING USING TWO-DIMENSIONAL SCISSOR REGIONS

TECHNICAL FIELD

This disclosure relates to graphic processing.

BACKGROUND

Graphics processing devices may be configured to render images generated by video game applications, spread sheet applications, applications that display pictures, and other applications that generate viewable images. A graphics processing device may be configured to render objects of the generated viewable images in accordance with various specifications. In general, an object may refer to a portion of an image. As one example, a graphics processing device may be configured to render objects in accordance with the OpenVG specification. The "OpenVG Specification, Version 1.1," was released in December 2008 and is publicly available.

Techniques described in the OpenVG specification may be applicable to process graphics for two dimensional (2-D) images. The OpenVG specification describes scissor regions. Objects that are partially or fully within the scissor regions may be processed for display. Objects that are partially or fully outside the scissor regions may not be displayed, and may therefore not be processed. Hence, rendering of objects in a graphics processing device may involve management of the objectives relative to scissor regions.

SUMMARY

In general, aspects of this disclosure are related to transforming two dimensional (2-D) coordinates of one or more scissor regions into coordinates that include more than two dimensions, e.g., 3-D coordinates or 4-D coordinates. At least one of the transformed coordinates may be a value indicative of a scissor region, e.g., the z coordinate of the 3-D or 4-D coordinates. A processor may store the value indicative of the scissor region in a scissor buffer without needing to repeatedly clear the scissor buffer. One example of the processor is a graphics processing unit (GPU).

In one example, aspects of this disclosure are directed to a method comprising receiving, with a graphics processing unit (GPU) that is configured to receive only two dimensional (2-D) coordinates, 2-D coordinates of a scissor region, transforming the 2-D coordinates of the scissor region into coordinates that include more than two dimensions, storing a value indicative of the scissor region in one or more storage units of a scissor buffer based on the coordinates that include more than two dimensions.

In another example, aspects of this disclosure are directed to an apparatus comprising a scissor buffer, a first unit configured to receive two dimensional (2-D) coordinates of a scissor region, wherein the first unit is configured to receive only 2-D coordinates, and a second unit configured to transform the 2-D coordinates of the scissor region into coordinates that include more than two dimensions, and store a value indicative of the scissor region in one or more storage units of the scissor buffer based on the coordinates that include more than two dimensions, wherein at least one of the first unit and the second unit is formed at least partially in hardware.

In another example, aspects of this disclosure are directed to an apparatus comprising means for receiving two dimensional (2-D) coordinates of a scissor region, wherein the means for receiving is configured to receive only 2-D coordinates, means for transforming the 2-D coordinates of the scissor region into coordinates that include more than two dimensions, and means for storing a value indicative of the scissor region in one or more storage units of a scissor buffer based on the coordinates that include more than two dimensions, wherein at least one of the means for receiving, transforming, and storing is implemented at least partially in hardware.

In another example, aspects of this disclosure are directed to a computer-readable storage medium comprising instructions that cause one or more processors, upon reception of two dimensional (2-D) coordinates of a scissor region, to transform the 2-D coordinates of the scissor region into coordinates that include more than two dimensions, and store a value indicative of the scissor region in one or more storage units of a scissor buffer based on the coordinates that include more than two dimensions, wherein the one or more processors are configured to receive only 2-D coordinates.

The details of one or more examples are set forth in the accompanying drawings and the description below. Other features, objects, and advantages will be apparent from the description and drawings, and from the claims.

DETAILED DESCRIPTION

Aspects of this disclosure may be directed to rendering viewable images on a screen. One or more processors may generate the images in response to one or more instructions executed by the processors. The images may be formed by one or more objects. The one or more object may be considered as primitives and may be formed as triangles, rectangles, or other types of polygons.

In some instances, not all of the objects may be viewable on the screen. For example, objects or portions of objects whose coordinates reside outside of the screen may not be viewable. Also, one or more scissor regions may define viewable areas on the screen. Objects or portions of objects that are within the one or more scissor regions may be viewable. Objects or portions of objects that are outside the scissor regions may be clipped and not viewable.

The one or more scissor regions may be defined by the one or more processors. The one or more processors may also define the ordering of the one or more scissor regions. The scissor regions may be rectangles, triangles, circles, ovals, or other shapes. The scissor regions may only comprise two dimensions. The vertex coordinates of the scissor regions may be two dimensional (2-D) coordinates, e.g., (x, y).

In aspects of this disclosure, the one or more processors may retrieve vertex coordinates for each vertex of a scissor region, of the one or more scissor regions. The one or more processors may transform the vertex coordinates from 2-D into coordinates that include more than two dimensions, e.g., 3-D or 4-D coordinates. For example, the one or more processors may transform the (x, y) coordinates into (x, y, z) coordinates, e.g., 3-D coordinates, or (x, y, z, w) coordinates, e.g., 4-D coordinates. As one example, to transform the 2-D coordinates to 3-D coordinates or 4-D coordinates, the one or more processors may multiply the retrieved 2-D coordinates with a transform matrix to convert the 2-D coordinates into 3-D coordinates or 4-D coordinates.

The one or more processors may then store a value indicative of the scissor region in a scissor buffer. In some examples, the one or more processors may store the value indicative of the scissor region in one or more storage units of the scissor buffer based on the coordinates that include more than two dimensions, e.g., based on the 3-D coordinates or 4-D coordinates. The scissor buffer may be 2-D matrix of storage units, where the 2-D matrix of storage units is approximately the same size as the screen upon which the object is displayed. As one example, the value indicative of the scissor region may be the z coordinate of the transformed coordinates.

After storing a value indicative of the scissor region, the one or more processors may determine which objects or portions of objects reside within that scissor region. The one or more processors may clip objects or portions of objects that reside outside that scissor region. The one or more processors may store objects or portions of objects that reside within that scissor region in a color buffer. Similar to the scissor buffer, the color buffer may be a 2-D matrix of storage units, where the 2-D matrix of storage units is approximately the same size as the screen upon which the object is displayed.

The one or more processors may then repeat the above steps for each scissor region. However, for each scissor region, the value indicative of that scissor region may be different. For example, the value indicative of a scissor region may be 1. For another scissor region, the value indicative of that scissor region may be 2, and so forth for each scissor region.

Figure 1:
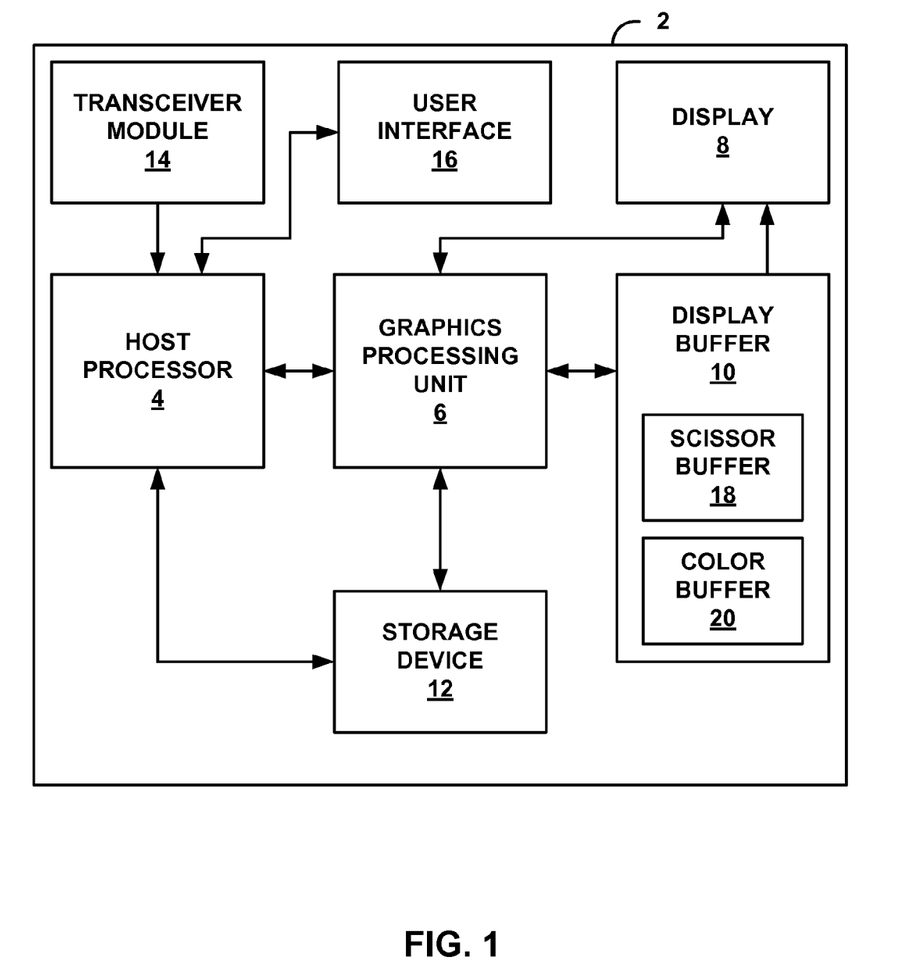
FIG. 1 is a block diagram illustrating a device including a graphics processing unit (GPU) that may be configured to implement aspects of this disclosure.

FIG. 1 is a block diagram illustrating device 2 that may be configured to implement aspects of this disclosure. Examples of device 2 include, but are not limited to, mobile wireless telephones, personal digital assistants (PDAs), video gaming consoles that include video displays, mobile video conferencing units, laptop computers, desktop computers, television set-top boxes, and the like. Device 2 may include host processor 4, graphics processing unit (GPU) 6, display 8, display buffer 10, storage device 12, transceiver module 14, and user interface 16. Device 2 may include additional modules or units not shown in FIG. 1 for purposes of clarity. For example, device 2 may include a speaker and a microphone, neither of which are shown in FIG. 1, to effectuate telephonic communications in examples where device 2 is a mobile wireless telephone. Furthermore, the various modules and units shown in device 2 may not be necessary in every example of device 2. For example, user interface 16 and display 8 may be external to device 2 in examples where device 2 is a desktop computer.

Host processor 4 may execute one or more applications. Examples of the applications include web browsers, e-mail applications, spreadsheets, video games, or other applications that generate viewable objects for display. Instructions for execution of the one or more applications may be stored within storage device 12. In some instances, host processor 4 may download the one or more applications via transceiver module 14. Host processor 4 may execute the one or more applications based on a selection by a user via user interface 16. In some examples, host processor 4 may execute the one or more applications without user interaction.

Examples of host processor 4 include, but are not limited to, a digital signal processor (DSP), general purpose microprocessor, application specific integrated circuit (ASIC), field programmable logic array (FPGA), or other equivalent integrated or discrete logic circuitry. Storage device 12 may comprise one or more computer-readable storage media. Examples of storage device 12 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to carry or store desired program code in the form of instructions or data structures and that can be accessed by a computer or a processor.

In some aspects, storage device 12 may include instructions that cause host processor 4 and/or GPU 6 to perform the functions ascribed to host processor 4 and GPU 6 in this disclosure. Accordingly, storage device 12 may be a computer-readable storage medium comprising instructions that cause one or more processors, e.g., host processor 4 and/or GPU 6, to perform various functions.

Storage device 12 may, in some examples, be considered as a non-transitory storage medium. The term "non-transitory" may indicate that the storage medium is not embodied in a carrier wave or a propagated signal. However, the term "non-transitory" should not be interpreted to mean that storage device 12 is non-movable. As one example, storage device 12 may be removed from device 2, and moved to another device. As another example, a storage device, substantially similar to storage device 12, may be inserted into device 2. In certain examples, a non-transitory storage medium may store data that can, over time, change (e.g., in RAM).

Examples of user interface 16 include, but are not limited to, a trackball, a mouse, a keyboard, and other types of input devices. User interface 16 may also be a touch screen and may be incorporated as a part of display 8. Transceiver module 14 may include circuitry to allow wireless or wired communication between device 2 and another device or a network. Transceiver module 14 may include modulators, demodulators, amplifiers and other such circuitry for wired or wireless communication.

Upon execution of one or more applications, host processor 4 may generate viewable images to be displayed on display 8. The viewable images may be formed as one or more objects. The one or more objects may be considered as primitives and may be formed as triangles, rectangles, or other types of polygons. Each one of the objects may include one or more pixels of display 8. However, not all of the one or more objects may be displayed. As described in more detail below, some objects or portions of objects may be clipped. The clipped objects or portions of objects may not be displayed.

Host processor 4 may also be configured to assign pixel values to each of the vertices of the objects. The pixel values may include various components. For example, the pixel values may include the 2-D coordinates of the vertices, color values of the vertices, transparency values of the vertices, and texture coordinates of the vertices. The pixel values need not include all of the above component examples, in every aspect of this disclosure.

The color values may be defined by three components: a red component, a green component, and a blue component, e.g., RGB components. In some examples, the color values may also include a transparency value which may indicate the transparency of the pixel. Texture coordinates may be defined by horizontal and vertical coordinates.

In example aspects of this disclosure, vertices of the objects may be defined in only two-dimensional (2-D) coordinates, e.g., by an x-coordinate and a y-coordinate represented as (x, y) coordinates. For example, host processor 4 may define vertices of the objects in only 2-D coordinates. The 2-D coordinates may be 2-D coordinates of display 8.

Furthermore, in some examples, host processor 4 may also define one or more scissor regions. The one or more scissor regions may define viewable areas on display 8. For example, for a given scissor region, objects or portions of objects that reside within the given scissor region may be rendered for display on display 8. Objects or portions of objects that reside outside the given scissor region may be clipped, and may not be rendered for display on display 8.

The scissor regions may be formed as triangles, rectangles, or other types of polygons. For purposes of illustration, aspects of this disclosure are described in the context of the scissor regions being rectangles. However, aspects of this disclosure are not limited to the use of rectangles as scissor regions. Rather, aspects of this disclosure include scissor regions of any shape such as triangles or other types of polygons.

In example aspects of this disclosure, the vertices of the scissor regions may also be defined in only 2-D coordinates. For example, host processor 4 may define vertices of the scissor regions in only 2-D coordinates, e.g., (x, y) coordinates. Similar to the 2-D coordinates for the objects, the 2-D coordinates of the scissor regions may be 2-D coordinates of display 8.

Display 8 may comprise a liquid crystal display (LCD), a cathode ray tube (CRT) display, an organic light emitting diode (OLED) display, a plasma display, or another type of display device. Display 8 includes a plurality of pixels arranged horizontally and vertically in a 2 dimensional (2-D) pixel array. Each pixel of display 8 may be identifiable by its 2-D coordinate, e.g., (x, y) coordinates. For example, the pixel located at the top-left corner of display 8 may be identified as the pixel located at (0, 0). The pixel immediately to the right of the pixel located at (0, 0) may be identified as the pixel located at (1, 0). The pixel immediately below the pixel located at (0, 0) may be identified as the pixel located at (0, 1). Other pixels of display 8 may be similarly identified. The example locations of the pixels are described for illustration purposes only. In some examples, the pixel located at (0, 0) may be at the bottom-left, top-right, bottom-right, or any other pixel location of display 8.

In some examples of this disclosure, host processor 4 may transmit the 2-D coordinates for the one or more scissor regions and the 2-D coordinates for the one or more objects to GPU 6. GPU 6 may be configured to receive only 2-D coordinates, and may not be configured to receive coordinates in any other dimension. For example, software executing on GPU 6 may be configured to only receive 2-D coordinates.

GPU 6 may be configured to process the one or more scissor regions and objects for display on display 8. For example, as described in more detail below, GPU 6 may clip objects or portions of objects that reside outside the one or more scissor regions. For the objects or portions of objects that reside within the one or more scissor regions, GPU 6 may generate pixel values for the pixels encompassed by the objects or portions of objects that reside within the one or more scissor regions.

Similar to host processor 4, examples of GPU 6 include, but are not limited to, a DSP, a general purpose microprocessor, an ASIC, an FPGA, or other equivalent integrated or discrete logic circuitry. Furthermore, although shows as separate units in FIG. 1, in some examples, GPU 6 may be formed as part of host processor 4.

GPU 6 may be configured to transform the received 2-D coordinates for the one or more scissor regions into coordinates that include more than two dimensions, e.g., 3-D coordinates or 4-D coordinates. For example, GPU 6 may transform the (x, y) coordinates for all of the vertices of each scissor region into (x, y, z) coordinates, e.g., 3-D coordinates, or (x, y, z, w) coordinates, e.g., 4-D coordinates. For the 3-D coordinates and the 4-D coordinates, the z coordinate may represent a "depth" of the scissor region. The term "depth" is utilized for ease of understanding. However, because the scissor regions are defined in 2-D coordinates, the term "depth" should not be interpreted in a limiting manner to require that one scissor region is further away relative to other scissor regions.

For the 4-D coordinates, the w coordinate may form a part of a homogenous coordinate system. The w coordinate value may be a divisor for the x, y, and z coordinate values to aid in rendering coordinates that are infinitely far away. In aspects of this disclosure, the w coordinate value may generally be one (1) because scissor regions are defined in 2-D coordinates, and are therefore not infinitely far away. For purposes of illustration, aspects of this disclosure are described where the w coordinate value is one. However, aspects of this disclosure need not be so limited. As one non-limiting example, if the w coordinate value is two, the values of the x, y, and z coordinates may be scaled by two. In general, in examples where the w coordinate value is different than one, the values of the x, y, and z coordinates may be scaled by the value of the w coordinate. In examples where the 2-D coordinates are transformed to 3-D coordinates, the w coordinate may not be needed.

In some examples, GPU 6 may assign a numerical identifier to each of the one or more scissor regions. For example, the numerical identifier for a first scissor region may be 1. The numerical identifier for a second scissor region may be 2, and so forth. In aspects of this disclosure, it may not be necessarily important which scissor region is identified as 1, 2, and so forth, provided that each scissor region is individually identified with a unique numerical identifier.

In some alternate examples, it may be important which scissor region is identified as 1, 2, and so forth. In some instances, GPU 6 may assign the numerical identifier based on the order in which GPU 6 received the scissor regions from host processor 4. In these instances, host processor 4 may order the scissor regions, e.g., from the back-most scissor region to the front-most scissor region, or vice-versa. In these examples, GPU 6 may assign numerical identifiers based on the order of the scissor regions. As one example, GPU 6 may assign the numerical identifier of 1 to the back-most scissor region, the numerical identifier of 2 to the next back-most scissor region, and so forth. As an alternate example, GPU 6 may assign the numerical identifier of 1 to the front-most scissor region, the numerical identifier of 2 to the next front-most scissor region, and so forth.

In some aspects of this disclosure, the back-most scissor region may be overlapped by other scissor regions, but may not overlap any other scissor regions. The next back-most scissor region may overlap the back-most scissor region, and may be overlapped by other scissor regions; however, such a situation may not be necessary in every example. The front-most scissor region may not be overlapped by any other scissor region, and may overlap one or more other scissor regions. However, as before, this may not be necessary in every example.

To transform the 2-D coordinates of a scissor region into coordinates that include more than two dimensions, e.g., 3-D coordinates or 4-D coordinates, GPU 6 may multiply the 2-D coordinates of the vertices of the scissor region with a 3-D transform matrix or a 4-D transform matrix, respectively. In some examples, the 3-D transform matrix may comprise a 3×3 matrix, and the 4-D transform matrix may comprise a 4×4 matrix.

One example of the 4-D transform matrix is $$\begin{bmatrix} 1 & 0 & 0 & 0 \\ 0 & 1 & 0 & 0 \\ 0 & 0 & 1 & i \\ 0 & 0 & 0 & 1 \end{bmatrix},$$

where "i" equals the numerical identifier for a scissor region. One example of the 3-D transform matrix is $$\begin{bmatrix} 1 & 0 & 0 \\ 0 & 1 & 0 \\ 0 & 0 & i \end{bmatrix},$$

where "i" equals the numerical identifier for a scissor region

As described above, to transform a scissor region defined in 2-D coordinates to a transformed scissor region defined in 3-D coordinates or 4-D coordinates, GPU 6 may multiply the 2-D coordinates with the 3-D transform matrix or the 4-D transform matrix, respectively. The 2-D coordinates may be considered as a matrix of 1×2, e.g., $$\begin{bmatrix} x \\ y \end{bmatrix}.$$

For example, assume that the vertex coordinates for a rectangular scissor region are as follows: (x1, y1), (x1, y2), (x2, y1), and (x2, y2). In this example, the 1×2 matrix for each vertex coordinate is:

$$\begin{bmatrix} x1 \\ y1 \end{bmatrix}, \begin{bmatrix} x1 \\ y2 \end{bmatrix}, \begin{bmatrix} x2 \\ y1 \end{bmatrix}, \text{ and } \begin{bmatrix} x2 \\ y2 \end{bmatrix},$$

respectively.

However, mathematically, it may not be possible to multiply a 1×2 matrix with a 3×3 matrix, e.g., the 3-D transform matrix, or with a 4×4 matrix, e.g., the 4-D transform matrix. To allow multiplication between 2-D coordinates and the 3-D transform matrix or 4-D transform matrix, GPU 6 may include additional values, along with the 2-D coordinates, to create a new matrix which may be multiplied with a 3×3 matrix or with a 4×4 matrix. In examples where GPU 6 is configured to multiply the 2-D coordinates with a 4×4 transform matrix, GPU 6 may include additional values in the 1×2 matrix to form a 1×4 matrix. One example of the 1×4 matrix is $$\begin{bmatrix} x \\ y \\ 0 \\ 1 \end{bmatrix},$$

where x and y are the x and y coordinates of a vertex of a scissor region. In this example, the additional values, added to the 1×2 matrix to form the 1×4 matrix, are 0 and 1.

It is mathematically possible to multiple a 1×4 matrix with a 4×4 matrix. The result of the multiplication is a 1×4 matrix. For example, the multiplication of $$\begin{bmatrix} x \\ y \\ 0 \\ 1 \end{bmatrix}$$

with the $$\begin{bmatrix} 1 & 0 & 0 & 0 \\ 0 & 1 & 0 & 0 \\ 0 & 0 & 1 & i \\ 0 & 0 & 0 & 1 \end{bmatrix}$$

4-D transform matrix results in the following matrix:

$$\begin{bmatrix} x \\ y \\ i \\ 1 \end{bmatrix}.$$

In examples where GPU 6 is configured to multiply the 2-D coordinates with a 3×3 transform matrix, GPU 6 may include an additional value in the 1×2 matrix to form a 1×3 matrix. One example of the 1×3 matrix is $$\begin{bmatrix} x \\ y \\ 1 \end{bmatrix},$$

where x and y are the x and y coordinates of a vertex of a scissor region. In this example, the additional value, added to the 1×2 matrix to form the 1×3 matrix, is 1.

It is mathematically possible to multiply a 1×3 matrix with a 3×3 matrix. The result of the multiplication is a 1×3 matrix. For example, the multiplication of $$\begin{bmatrix} x \\ y \\ 1 \end{bmatrix}$$

with the $$\begin{bmatrix} 1 & 0 & 0 \\ 0 & 1 & 0 \\ 0 & 0 & i \end{bmatrix}$$

3-D transform matrix results in the following matrix:

$$\begin{bmatrix} x \\ y \\ i \end{bmatrix}.$$

In aspects of this disclosure, to perform clipping for a desired scissor region, e.g., clipping objects or portions of objects that reside outside the desired scissor region, GPU 6 may transform the 2-D coordinates of each vertex of the desired scissor region to coordinates that include more than two dimensions, e.g., 3-D coordinates or 4-D coordinates. As described in more detail below, GPU 6 may perform clipping based on the z coordinate of the 3-D coordinates or 4-D coordinates. The desired scissor region may be selected by host processor 4.

Whether GPU 6 transforms the 2-D coordinates of each vertex to 3-D coordinates or 4-D coordinates may depend on design considerations, and not necessarily a limitation of aspects of this disclosure. In general, GPU 6 may transform the 2-D coordinates of each vertex to any additional dimension of coordinates. Accordingly, in some examples, GPU 6 may be configured to transform 2-D coordinates to 3-D coordinates or 4-D coordinates. In some examples, GPU 6 may be configured to transform 2-D coordinates to coordinates that include more than two dimensions, including more coordinates than 4-D coordinates. For purposes of illustration, aspects of this disclosure are described in the context where GPU 6 transforms 2-D coordinates into 4-D coordinates.

To transform the 2-D coordinates of the vertices of a scissor region into 4-D coordinates, GPU 6 may implement techniques similar to those described above. For example, host processor 4 may define a scissor region and transmit the coordinates of the scissor region to GPU 6. GPU 6 may assign a numerical identifier to the scissor region. For purposes of illustration, assume the scissor region is a rectangular scissor region with four vertices. Each of the four vertices comprises a 1×2 matrix of 2-D coordinates. GPU 6 may convert each one of the four 1×2 matrices of 2-D coordinates into four 1×4 matrices. GPU 6 may then multiply each one of the 1×4 matrices with the 4-D transform matrix, e.g., the 4×4 matrix. In this example, the value of "i" in the 4×4 matrix may be the numerical identifier of the scissor region.

As one example, assume that the numerical identifier for the scissor region is 5. Further, assume that the scissor region includes four vertices with the following 2-D coordinates: (x1, y1), (x2, y1), (x1, y2), and (x2, y2). In this example, the result of the multiplication of each of the four vertices with the 4-D transform matrix is:

$$\begin{bmatrix} x1 \\ y1 \\ 5 \\ 1 \end{bmatrix}, \begin{bmatrix} x2 \\ y1 \\ 5 \\ 1 \end{bmatrix}, \begin{bmatrix} x1 \\ y2 \\ 5 \\ 1 \end{bmatrix}, \text{ and } \begin{bmatrix} x2 \\ y2 \\ 5 \\ 1 \end{bmatrix},$$

where the value of "i" in the 4-D transform matrix is 5. In this example, the 4-D coordinates for the scissor region are as follows: (x1, y1, 5, 1), (x2, y1, 5, 1), (x1, y2, 5, 1), and (x2, y2, 5, 1). Accordingly, in some examples, GPU 6 may transform the 2-D coordinates of the scissor region into coordinates that include more than two dimensions, e.g., 3-D coordinates and 4-D coordinates, based on the assigned numerical identifier.

After transformation of the 2-D coordinates of the scissor region into 4-D coordinates, GPU 6 may store a value indicative of the desired scissor region in scissor buffer 18 of display buffer 10. Examples of display buffer 10 include, but are not limited to, RAM, ROM, EEPROM, CD-ROM or other optical disk storage, magnetic disk storage, or other magnetic storage devices, and flash memory. Although display buffer 10 is shown as separate from storage device 12, in some examples, display buffer 10 may be formed as part of storage device 12.

Scissor buffer 18 may be a 2-D matrix of storage units, where each storage unit within the 2-D matrix may be configured to store a value indicative of the scissor region. The size of scissor buffer 18 may be the same as the size of display 8. For example, if the size of display 8 is 640 pixels by 480 pixels, scissor buffer 18 may be a 640 by 480 matrix of storage units that are configured to store values.

As described above, scissor buffer 18 may be configured to store the values indicative of one or more scissor regions. Each of the one or more scissor regions may be at different "depths." Accordingly, in this sense, scissor buffer 18 may be considered to be a depth buffer.

Also, as described above, GPU 6 may transform the 2-D coordinates of the scissor region into coordinates that include more than two dimensions, e.g., 3-D coordinates or 4-D coordinates. The value indicative of the scissor region may be based on the coordinates that include more than two dimensions. As one example, the value indicative of the scissor region may be the z coordinate of the 4-D coordinates.

In some examples, the z coordinate of the 4-D coordinates may be the same as the numerical identifier of the desired scissor region. For instance, in the previous example, the z coordinate of the 4-D coordinates is 5 and the numerical identifier of the scissor region is also 5. In other words, the assigned numerical identifier may be the same as at least one coordinate of the coordinates that include more than two dimensions, e.g., the z coordinate of the 4-D coordinates.

In aspects of this disclosure, GPU 6 may store the value indicative of the scissor region at storage units located in scissor buffer 18 that correspond to the x and y coordinates of the 4-D coordinates. For example, assume that the 2-D coordinates for the four vertices of the desired scissor region are: (100, 100), (100, 200), (200, 100), and (200, 200). Also, assume that the numerical identifier for the desired scissor region is 10. Based on the techniques described above, after transformation, the 4-D coordinates for the scissor region are: (100, 100, 10, 1), (100, 200, 10, 1), (200, 100, 10, 1), and (200, 200, 10, 1). In this example, in the storage units located at (100, 100), (100, 200), (200, 100), and (200, 200) in scissor buffer 18, GPU 6 may store the value of 10, which indicates the value indicative of the scissor region.

Furthermore, in some examples, GPU 6 may store the value indicative of the scissor region in all storage units that are encompassed by the combination of x and y coordinates of the 4-D coordinates. For instance, keeping with the previous example, for all storage units of scissor buffer 18 that are located between the ends of the x and y coordinates, GPU 6 may store the value of 10. For example, for the storage unit located at (150, 175) in scissor buffer 18, GPU 6 may store the value of 10 because both the x and y coordinates, e.g., 150 and 175, respectively, are encompassed by the combination of x and y coordinates of the 4-D coordinates. For the storage unit located at (300, 150), GPU 6 may not store the value of 10 because the x coordinate, i.e., 300, is greater than 200. Similarly, for the storage unit located at (120, 50), GPU 6 may not store the value of 10 because the y coordinate, i.e., 50, is less than 100.

Accordingly, in some examples, GPU 6 may store the value indicative of the scissor region in one or more storage units of scissor buffer 18 based on the coordinates that include more than two dimensions, e.g., the 3-D coordinates or the 4-D coordinates. The value indicative of the scissor region may be the assigned numerical identifier, e.g., 10 in the previous example. At least one coordinate, e.g., the z coordinate, of the coordinates that include more than two dimensions may be equivalent to the assigned numerical identifier, e.g., the z coordinate and the assigned numerical identifier are both 10 in the previous example.

To perform clipping for the scissor region, GPU 6 may clip objects or portions of objects that reside outside the desired scissor region. For each 2-D coordinate of the objects, GPU 6 may determine whether scissor buffer 18 stores a value indicative of the scissor region at the storage unit located at those 2-D coordinates. If the storage unit located at those 2-D coordinates in scissor buffer 18 stores a value indicative of the scissor region, GPU 6 may generate pixel values for the pixels within the objects or portions of objects, as described in more detail below. GPU 6 may then store the generated pixel values of the object in a storage unit located at the corresponding coordinate in color buffer 20 of display buffer 10.

Similar to scissor buffer 18, color buffer 20 may be a 2-D matrix of storage units, where each storage unit within the 2-D matrix may be configured to store pixel values for pixels of display 8 that are encompassed by the objects or portions of objects resulting from the clipping. The size of color buffer 20 may be the same size of scissor buffer 18, which may be the same size as display 8.

For instance, like scissor buffer 18, color buffer 20 may include 640 by 480 storage units that are configured to store pixel values if the size of display 8 is 640 pixels by 480 pixels. As one example, to store pixel values for a pixel located at (140, 150) on display 8, GPU 6 may store the pixel values for the pixel in the storage unit located at (140, 150) in color buffer 20.

Aspects of this disclosure may allow GPU 6 to store a value indicative of a scissor region in scissor buffer 18 and perform clipping relative to the scissor region without clearing scissor buffer 18 for each scissor region. Clearing of scissor buffer 18 may comprise setting all of the storage units of scissor buffer 18 to an initial value. For example, GPU 6 may initially clear scissor buffer 18 by setting all of the storage units of scissor buffer 18 to an initial value. Subsequent to the initial clearing of scissor buffer 18, utilizing the above techniques, GPU 6 may store the value indicative of a first scissor region in appropriate storage units of scissor buffer 18, and clip objects or portions of objects relative to the first scissor region. Then, without needing to clear scissor buffer 18, GPU 6 may store the value indicative of a second scissor region in appropriate storage units of scissor buffer 18, and clip object or portions of objects relative to the second scissor region, and so forth.

Repeated clearing of scissor buffer 18 may be bandwidth expensive and may require additional processing time, which may delay rendering of the pixels. In some instances, host processor 4 may generate ten or more scissor regions. Repeated clearing of scissor buffer 18 for each of the ten or more scissor regions may delay final rendering of the pixels. Accordingly, in some non-limiting examples, aspects of this disclosure may promote efficient bandwidth utilization that may accelerate rendering of the pixels.

In some aspects of this disclosure, GPU 6 may be configured for 2-D processing of scissor regions and objects, but may utilize 3-D or 4-D processing techniques to promote efficient bandwidth utilization. For example, host processor 4 and GPU 6 may be configured, in some aspects, in accordance with the OpenVG specification. However, in addition to performing functions in accordance with the OpenVG specification, host processor 4 and GPU 6 may be configured to utilize processing techniques in accordance with the OpenGL specification, to leverage processing techniques of the OpenGL specification. For example, host processor 4 and GPU 6 may be configured to leverage techniques in accordance with "OpenGL version 4.0," which was released on Mar. 11, 2010, "OpenGL ES version 1.1," which was released on Apr. 24, 2008, and "OpenGL ES version 2.0," which was released Apr. 22, 2009, and "OpenGL version 4.1," which was released on Jul. 25, 2010, all of which are available publicly.

As one example, in accordance with the OpenVG specification, host processor 4 may be configured to generate scissor regions and objects only in 2-D coordinates, and no other dimension. Also, in accordance with OpenVG specification, GPU 6 may be configured to only receive 2-D coordinates, and may not be configured to receive coordinates in any other dimensions. However, host processor 4 may transmit the 2-D coordinates to GPU 6 in accordance with functions defined in the OpenGL specification. Furthermore, GPU 6 may execute OpenGL functions to perform clipping relative to the scissor regions.

For example, to transmit the 2-D coordinates of the scissor region to GPU 6, host processor 4 may utilize the glVertexPointer function of OpenGL. The variables of the glVertexPointer function may be the 2-D coordinates of the scissor region. As another example, as described above, GPU 6 may initially clear scissor buffer 18. To initially clear scissor buffer 18, GPU 6 may utilize the glClear function of OpenGL. The variable of the glClear function may be the GL DEPTH BUFFER BIT, which may be 0. As yet another example, as described above, GPU 6 may perform clipping relative to the scissor region based on the value indicative of the scissor region. In these instances, GPU 6 may utilize the glTransferf function of OpenGL. The variable of the glTransferf function may be the value indicative of the desired scissor region, which may be the z coordinate of the transformed 2-D coordinates.

Moreover, in some examples, GPU 6 may utilize various other functions of OpenGL to promote efficient processing. For example, GPU 6 may utilize the early depth test functionality in accordance with the OpenGL specification. The early depth test functionality may allow GPU 6 to determine whether a pixel of an object is occluded by a pixel of another object. In these instances, GPU 6 may discard the occluded pixel early, e.g., before rendering the occluded pixel, and may only process the non-occluded pixel.

In some alternate examples, rather than transforming the 2-D coordinates to 3-D coordinates or 4-D coordinates, host processor 4 may include additional coordinates with the 2-D coordinates to generate 3-D or 4-D coordinates. For example, if the coordinates of a vertex of a scissor region are (x, y), host processor 4 may include a z coordinate to generate 3-D coordinates, e.g., (x, y, z), or a z and w coordinate to generate 4-D coordinates, e.g., (x, y, z, w). Host processor 4 may then transmit the 3-D coordinates or 4-D coordinates to GPU 6.

However, the bandwidth needed to transmit the additional coordinates, compared to the bandwidth needed to only transmit the 2-D coordinates may be substantially greater, e.g., by a factor of almost 50% in some examples. Accordingly, it may be desirable to transform the 2-D coordinates to 3-D coordinates or 4-D coordinates in GPU 6, rather than host processor 4 adding and transmitting the additional coordinates.

Figure 2A:
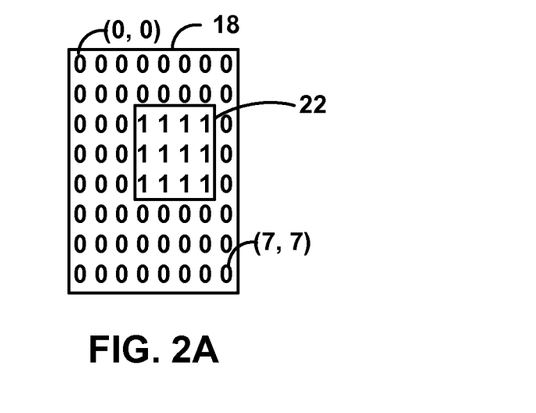
FIG. 2A is a graphical diagram illustrating a value indicative of a first scissor region stored in storage units of a scissor buffer.
Figure 2B:
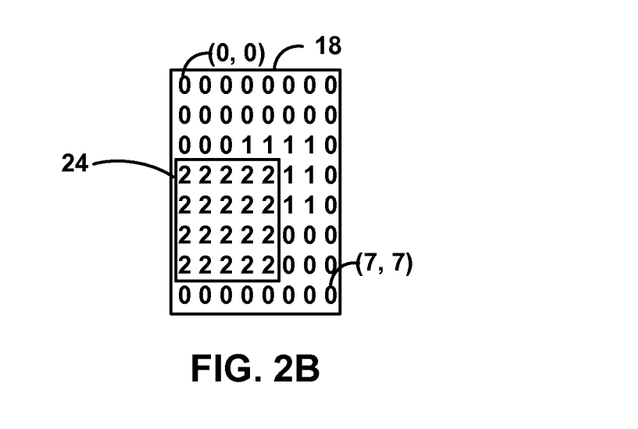
FIG. 2B is a graphical diagram illustrating a value indicative of a second scissor region stored in storage units of the scissor buffer after a GPU performs clipping on objects or portions of objects relative to the first scissor region.

FIG. 2A is a graphical diagram illustrating a value indicative of a first scissor region stored in storage units of scissor buffer 18. FIG. 2B is a graphical diagram illustrating a value indicative of a second scissor region stored in storage units of scissor buffer 18 after GPU 6 performs clipping on objects or portions of objects relative to the first scissor region. As illustrated in FIGS. 2A and 2B, scissor buffer 18 includes a 2-D matrix of storage units. The size of the 2-D matrix of storage units may be 8×8, as illustrated in FIGS. 2A and 2B. The top left storage unit of scissor buffer 18 may be located at (0, 0), and the bottom right storage unit of scissor buffer 18 may be located at (7, 7). The example storage units of scissor buffer 18, in FIGS. 2A and 2B, are shown for illustration purposes only. In other examples, scissor buffer 18 may include more than 8×8 storage units, e.g., 640×480 storage units, or other possible number of storage units.

The coordinates of the storage units of scissor buffer 18 are provided for illustration purposes only, and should not be considered as limiting. In different examples, the coordinate of the storage unit located at the bottom left may be (0, 0), the coordinate of the storage unit located at the top right may be (0, 0), or the coordinate of the storage unit located at the bottom right may be (0, 0). The location of all of the other storage units of scissor buffer 18 may be based on the storage unit located at (0, 0).

GPU 6 may first clear scissor buffer 18. To clear scissor buffer 18, GPU 6 may assign each of the storage units of scissor buffer 18 the value of 0. The initial value of 0 is provided for illustration purposes only. In different examples, GPU 6 may initially assign each of the storage units of scissor region 18 a value other than 0, e.g., 1. In these examples, GPU 6 may assign the first scissor region the value of 2, and the second scissor region the value of 3, and so forth. Aspects of this disclosure are described where the initial value of the storage units of scissor region 18 is 0.

Based on the above techniques, as shown in FIG. 2A, GPU 6 may store the value indicative of a first scissor region, shown as scissor region 22, in scissor buffer 18. For example, GPU 6 may receive the 2-D vertex coordinates of scissor region 22 from host processor 4. In the example of FIG. 2A, the vertex coordinates of scissor region 22 are (3, 2), (6, 2), (3, 4), and (6, 4). Because scissor region 22 is the first received scissor region, GPU 6 may assign the numerical identifier of 1 to scissor region 22.

In this example, GPU 6 may transform the 2-D coordinates to 4-D coordinates by multiplying the 2-D coordinates with the 4-D transform matrix, utilizing the above described techniques. The resulting 4-D coordinates for the vertices of scissor region 22 are (3, 2, 1, 1), (6, 2, 1, 1), (3, 4, 1, 1), and (6, 4, 1, 1). As described above, the z coordinate of the resulting 4-D coordinates may be the numerical identifier of scissor region 22, e.g., 1.

GPU 6 may then store the numerical identifier, e.g., 1, in corresponding storage units of scissor buffer 18. In FIG. 2A, the corresponding storage units of scissor buffer 18 may be a first set of storage units of scissor buffer 18. For instance, as shown in FIG. 2A, GPU 6 may store the value of 1 at the storage units located at (3, 2), (6, 2), (3, 4), and (6, 4) within scissor buffer 18. Furthermore, GPU 6 may also store the numerical identifier, e.g., 1, in storage units of scissor buffer 18 that are located within the storage units located at (3, 2), (6, 2), (3, 4), and (6, 4), as shown in FIG. 2A.

GPU 6 may then perform clipping for the objects or portions of objects that are within scissor region 22. For example, for pixels of display 8 that are within the objects or portions of objects that are also encompassed by scissor region 22, GPU 6 may generate pixel values for those pixels and store the pixel values for those pixels in color buffer 20, and may discard all other pixels of the objects that reside outside scissor region 22.

As illustrated in FIG. 2B, GPU 6 may store the value indicative of a second scissor region, shown as scissor region 24, in scissor buffer 18. In some aspects of this disclosure, GPU 6 may store the value indicative of scissor region 24, in scissor buffer 18, without re-clearing scissor buffer 18. For example, GPU 6 may receive the 2-D vertex coordinates of scissor region 24 from host processor 4. In the example of FIG. 2B, the vertex coordinates of scissor region 24 are (0, 3), (4, 3), (0, 6), and (4, 6). Because scissor region 24 is the second received scissor region, GPU 6 may assign the numerical identifier of 2 to scissor region 24.

In this example, GPU 6 may transform the 2-D coordinates to 4-D coordinates by multiplying the 2-D coordinates with the 4-D transform matrix, utilizing the above described techniques. The resulting 4-D coordinates for the vertices of scissor region 24 are (0, 3, 2, 1), (4, 3, 2, 1), (0, 6, 2, 1), and (4, 6, 2, 1). As described above, the z coordinate of the resulting 4-D coordinates may be the numerical identifier of scissor region 24, e.g., 2. The w coordinate may be the homogenous coordinate.

GPU 6 may then store the numerical identifier, e.g., 2, in corresponding storage units of scissor buffer 18. In FIG. 2B, the corresponding storage units of scissor buffer 18 may be a second set of storage units of scissor buffer 18. For instance, as shown in FIG. 2B, GPU 6 may store the value of 2 at the storage units located at (0, 3), (4, 3), (0, 6), and (4, 6) within scissor buffer 18. Furthermore, GPU 6 may also store the numerical identifier, e.g., 2, in storage units of scissor buffer 18 that are located within the storage units located at (0, 3), (4, 3), (0, 6), and (4, 6), as shown in FIG. 2B.

In example aspects of this disclosure, GPU 6 may store the numerical identifier of 2 without re-clearing scissor buffer 18. For example, as illustrated in the example of FIG. 2B, the stored values for some of the storage units of scissor buffer 18 may be 2, and the stored values for some of the storage units of scissor buffer 18 may remain at 1.

GPU 6 may then perform clipping for the objects or portions of objects that are within scissor region 24. For example, for pixels of display 8 that are within the objects or portions of objects that are also encompassed by scissor region 24, GPU 6 may generate pixel values for those pixels and store the pixel values for those pixels in color buffer 20, and may discard all other pixels of the objects that reside outside scissor region 24.

Figure 3:
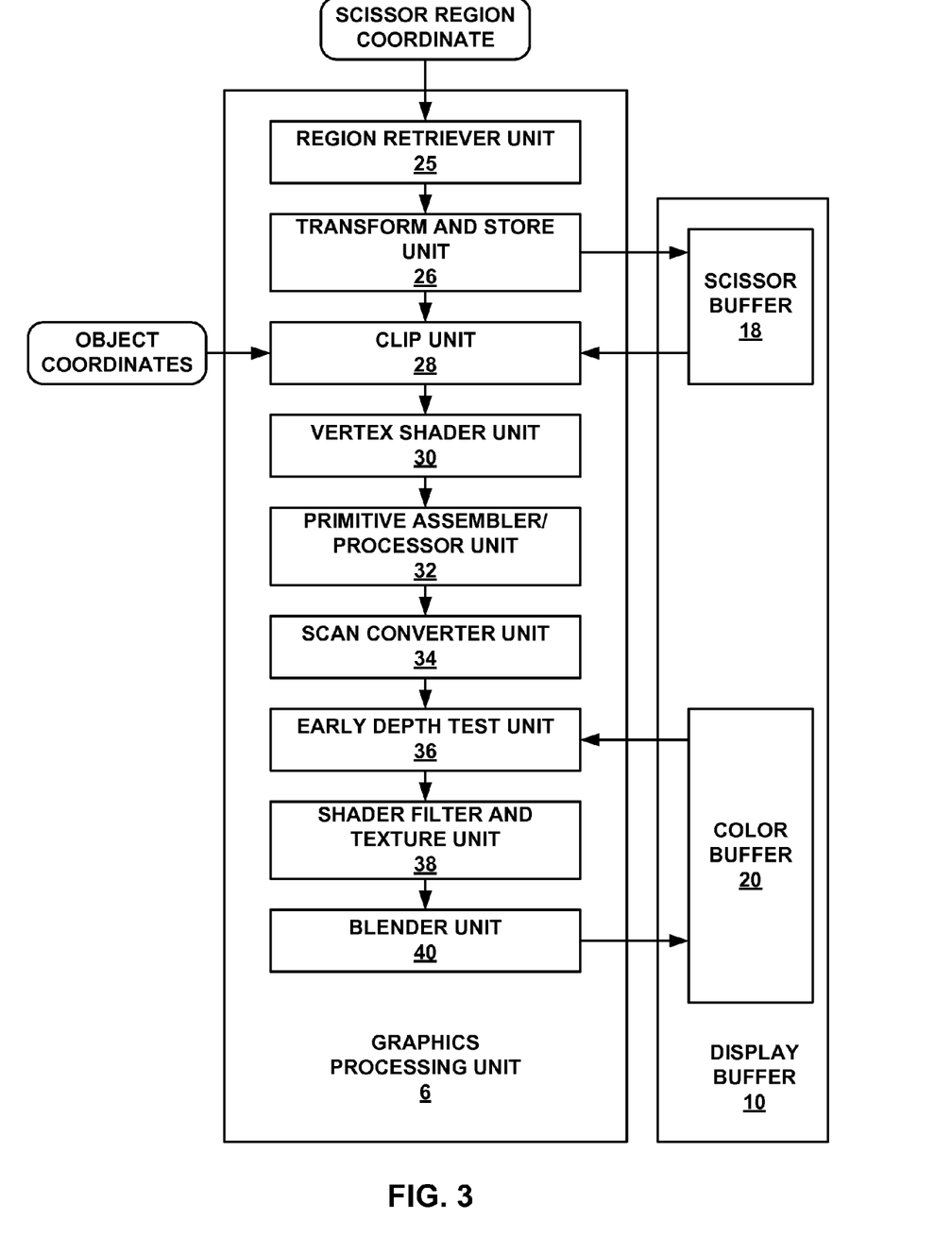
FIG. 3 is a block diagram illustrating example units of the GPU, of FIG. 1, in further detail.

FIG. 3 is a block diagram illustrating example units of GPU 6, of FIG. 1, in further detail. GPU 6 may include region retriever unit 25, transform and store unit 26, clip unit 28, vertex shader unit 30, primitive assembler/processor unit 32, scan converter unit 34, early depth test unit 36, shader filter and texture unit 38, and blender unit 40. The various units of GPU 6 may be implemented as hardware, as software executed on hardware, or a combination of both. In some examples, vertex shader unit 30, primitive assembler/processor unit 32, scan converter unit 34, early depth test unit 36, shader filter and texture unit 38, and blender unit 40 may be configured in accordance with the OpenGL specification.

Region retriever unit 25 may be configured to receive coordinates of one or more scissor regions from host processor 4. In aspects of this disclosure, region retriever unit 25 may only be able to receive 2-D coordinates of the scissor regions, and may not be able to receive coordinates in any other dimension. In some examples, the coordinates received by region retriever unit 25 may be the coordinates of the vertices of a scissor region. In some instances, coordinates for only two vertices may be sufficient to determine all of the coordinates of the scissor region. For example, region retriever unit 25 may receive the coordinates for the top left and bottom right vertices. From the top left and bottom right vertices, region retriever unit 25 may be able to determine the coordinates for the other vertices.

In some examples, region retriever unit 25 may be configured to assign the retrieved scissor region a numerical identifier. As one example, if the retrieved scissor region is the first scissor region, region retriever unit 25 may assign the first scissor region a numerical identifier of 1. If the retrieved scissor region is the second scissor region, region retriever unit 25 may assign the second scissor region a numerical identifier of 2, and so forth.

Transform and store unit 26 may transform the 2-D coordinates of each of the vertices from 2-D coordinates to coordinates that include more than two dimensions, e.g., 3-D coordinates or 4-D coordinates, based on the implementation. For purposes of illustration, transform and store unit 26 may transform the 2-D coordinates to 4-D coordinates for each vertex. Transform and store unit 26 may receive the 2-D coordinates for each vertex of the scissor region, and the numerical identifier for the scissor region from region retriever unit 25. Transform and store unit 26 may transform the 2-D coordinates based on the numerical identifier such that the z coordinate of the 3-D coordinates or 4-D coordinates is substantially the same as the numerical identifier.

As described above, to transform the 2-D coordinates to 4-D coordinates, transform and store unit 26 may include additional values with the 2-D coordinates to form a 1×4 matrix for each vertex, e.g., for all four vertices. Transform and store unit 26 may then multiply each of the four 1×4 matrices with the 4-D transform matrix, e.g., the 4×4 matrix described above. The "i" value of the 4×4 matrix may be the numerical identifier of the scissor region, as described above. The result of the multiplications may be four 1×4 matrices. The values of each of the four 1×4 matrices may be the 4-D coordinates of each of the four vertices. In some instances, the z coordinate value of the 4-D coordinates may be the numerical identifier of the scissor region.

Transform and store unit 26 may store the value indicative of the scissor region in corresponding storage units of scissor buffer 18. In the example of FIG. 3, scissor buffer 18 may have been previously cleared, e.g., the values of each of the storage units of scissor buffer 18 may be set to an initial value. In some examples, the x and y coordinates of the 4-D coordinates may indicate which storage units of scissor buffer 18 should store the value indicative of the scissor region. Transform and store unit 26 may store the value indicative of the scissor region in the storage units located at the x and y coordinates in scissor buffer 18 that correspond to each of the x and y coordinates of the transformed vertices. In some examples, transform and store unit 26 may store the value indicative of the scissor region in storage units of scissor buffer 18 that are within the storage units located at the corresponding x and y coordinates of the vertices.

Clip unit 28 may receive the value indicative of the scissor region from transform and store unit 26. Clip unit 28 may also receive coordinates of one or more objects from host processor 4. The coordinates of the one or more objects may only be 2-D coordinates, and not coordinates in any other dimension.

Based on the coordinates of the one or more objects and the value indicative of the scissor region, clip unit 28 may clip objects or portions of object that reside outside the scissor region. For instance, clip unit 28 may determine the location of the storage unit within scissor buffer 18 that store the value indicative of the scissor region. Clip unit 28 may then compare the vertex coordinates of the one or more objects to the coordinates of the storage units of scissor buffer 18 that store the value indicative of the scissor region.

Clip unit 28 may provide the vertex coordinates of objects or portions of objects that reside within the scissor region to vertex shader unit 30, as well as pixel values of the vertex coordinates of objects or portions of objects that reside within the scissor region to vertex shader unit 30. Clip unit 28 may discard the coordinates of objects or portions of objects that reside outside the scissor region. In this manner, clip unit 28 may perform clipping of one or more objects.

Vertex shader unit 30 may be configured to calculate light values for the received pixels based on the received pixel values and coordinates. Primitive assembler/processor unit 32 may be configured to compute parameters for subsequent rasterization of the pixels. As one example, primitive assembler/processor unit 32 may compute coefficients of linear equations for the objects or portions of objects. Scan converter unit 34 may assign the pixels coordinate values relative to the coordinate values on display 8.

In some examples, GPU 6 may include early depth test unit 36; although, early depth test unit 36 may not be necessary in every example of GPU 6. Early depth test unit 36 may determine whether a current pixel is occluded by another pixel. For instance, in examples where GPU 6 process the scissor regions in a front-to-back manner, if color buffer 20 already stores pixels values, for a pixel, at a particular storage unit of color buffer 20 and the x and y coordinates for a current pixel is the same as the x and y coordinates of the stored pixel, early depth test unit 36 may determine whether the stored pixel occludes the current pixel. Early depth test unit 36 may compare the transparency value of the stored pixel and the current pixel to determine if the stored pixel occludes the current pixel.

If the stored pixel occludes the current pixel, early depth test unit 36 may discard the current pixel. If the stored pixel does not occlude the current pixel, early depth test unit 36 may pass the pixel to shader filter and texture unit 38 for additional processing.

Shader filter and texture unit 38 may compute parameters for interpolation of the pixel values. For example, shader filter and texture unit 38 may compute linear equations for interpolation of pixel values. Based on the interpolation, shader filter and texture unit 38 may modify the pixel values of the various pixels such that the objects or portions of objects appear smooth to a user of device 2. Shader filter and texture unit 38 may also apply texture to each of the pixels. The texture may be based on the texture components of the pixel values. As one example, shader filter and texture unit 38 may apply 2D or 3D filters to modify the pixel values of the various pixels such that the objects or portions of objects appear smooth to the user of device 2.

To apply the 2D or 3D filters, in some instances, shader filter and texture unit 38 may execute a kernel. A kernel may be a function declared by shader filter and texture unit 38. The parameters of the function may be values for 2D or 3D filtering such that the objects or portions of objects appear smooth to the user of device 2.

Blender unit 40 may be configured to perform alpha testing, fog blending, alpha blending, logic operations, and dithering operations, which may all be performed according to the OpenGL specification. Blender unit 40 may then store the result for each pixel in color buffer 20.

Figure 4:
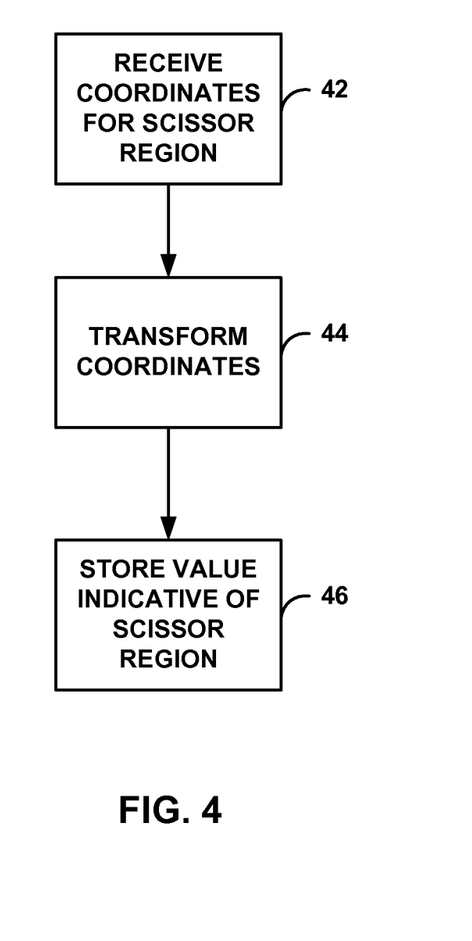
FIG. 4 is a flow chart illustrating an example operation of a GPU.

FIG. 4 is a flow chart illustrating an example operation of GPU 6. For purposes of illustration, reference is made to FIG.

3. Region retriever unit 25, of GPU 6, may receive coordinates for a scissor region (42). The coordinates of the scissor region may be 2-D coordinates of the vertices of the scissor region. In some examples, region retriever unit 25 may be configured to receive only 2-D coordinates, and may not be configured to receive coordinates in any other dimensions. In some examples, region retriever unit 25 may also assign a numerical identifier to the scissor region.

Transform and store unit 26 may be configured to transform the 2-D coordinates to coordinates that include more than two dimensions, e.g., 3-D coordinates or 4-D coordinates (44). In some examples, transform and store unit 26 may multiply the received 2-D coordinates with a 3-D transform matrix to generate the 3-D coordinates. In some examples, transform and store unit 26 may multiply the received 2-D coordinates with a 4-D transform matrix to generate the 4-D coordinates. Transform and store unit 26 may transform the 2-D coordinates based on the numerical identifier such that the z coordinate of the 3-D coordinates or 4-D coordinates is substantially the same as the assigned numerical identifier.

Transform and store unit 26 may then store a value indicative of the scissor region in one or more storage units of scissor buffer 18 based on the coordinates that include more than two dimensions, e.g., based on the 3-D or 4-D coordinates (46). The value indicative of the scissor region may be the z coordinate of the 3-D coordinates or 4-D coordinates. In some examples, scissor buffer 18 may have been initially cleared. In aspects of this disclosure, transform and store unit 26 may be configured to store the value indicative of the scissor region without re-clearing scissor buffer 18.

The one or more storage units of scissor buffer 18 may be the storage units at locations that correspond to the x and y coordinates of the 3-D or 4-D coordinates of the scissor region. Furthermore, transform and store unit 26 may be configured to store the value indicative of the scissor region at storage units that are encompassed between the storage units at locations that correspond to the x and y coordinates of the 3-D or 4-D coordinates of the scissor region.

Figure 5:
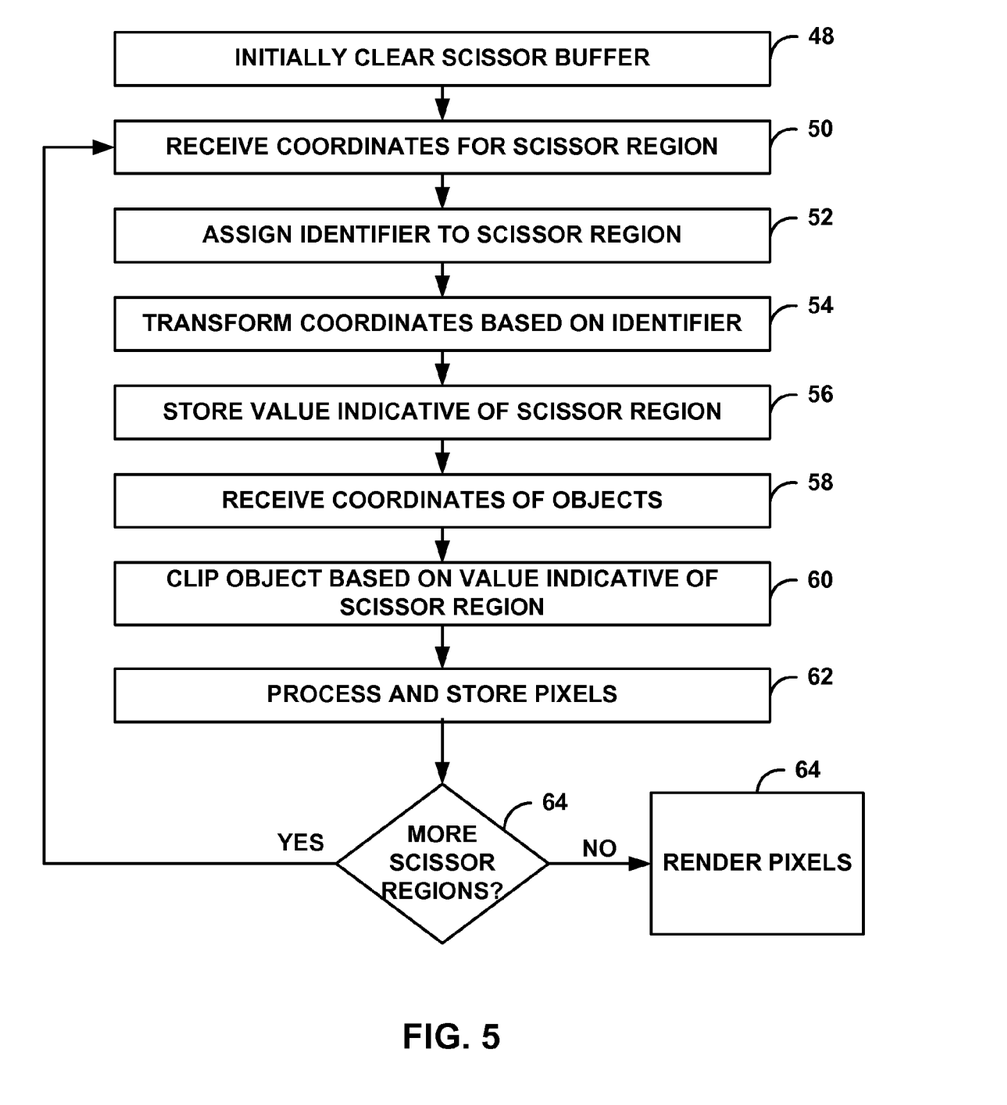
FIG. 5 is a flow chart illustrating another example operation of a GPU.

FIG. 5 is a flow chart illustrating another example operation of GPU 6. For purposes of illustration, reference is made to FIGS. 1 and 3. GPU 6 may initially clear scissor buffer 18 (48). To clear scissor buffer 18, in some examples, GPU 6 may store the value of 0 in each storage unit of scissor buffer 18. In some alternate examples, GPU 6 may store a value, other than 0, in each storage unit of scissor buffer 18 to clear scissor buffer 18. GPU 6 may utilize the glClear function of the OpenGL specification to clear scissor buffer 18.

As in the example of FIG. 4, region retriever unit 25, of GPU 6, may receive coordinates of vertices of a scissor region from host processor 4 (50). For example, host processor 4 may utilize the glVertexPointer function to transmit the coordinates of vertices of the scissor region to region retriever unit 25. The coordinates of the vertices may only be in 2-D coordinates. Region retriever unit 25 may assign a numerical identifier to the scissor region (52). In one example, if the coordinates of vertices are for a first scissor region, region retriever unit 25 may assign the numerical identifier value of 1 to the scissor region, assuming that the initial values of scissor buffer 18 are 0. If the coordinates of vertices are for a second scissor region, region retriever unit 25 may assign the numerical identifier value of 2 to the scissor region, and so forth. However, if the initial values of scissor buffer 18 are 1, then for the first scissor region, region retriever unit 25 may assign the numerical identifier value of 2, for the second scissor region, region retriever unit 25 may assign the numerical identifier value of 3, and so forth.

Transform and store unit 26 may be configured to transform the 2-D coordinates to 3-D coordinates or 4-D coordinates based on the assigned numerical identifier (54). In some examples, transform and store unit 26 may multiply the received 2-D coordinates with a 3-D transform matrix to generate the 3-D coordinates. In some examples, transform and store unit 26 may multiply the received 2-D coordinates with a 4-D transform matrix to generate the 4-D coordinates.

As described above, the 3-D transform matrix and the 4-D transform matrix include the value "i." In some examples, the value of "i" may be the assigned numerical identifier. Accordingly, transform and store unit 26 may utilize the assigned numerical identifier value to transform the received 2-D coordinates to 3-D coordinates or 4-D coordinates.

Similar to FIG. 4, transform and store unit 26 may then store a value indicative of the scissor region corresponding storage units of scissor buffer 18 (56). The value indicative of the scissor region may be the z coordinate of the 3-D coordinates or 4-D coordinates. The z coordinate of the 3-D coordinates or 4-D coordinates may be substantially the same as the assigned numerical identifier. In aspects of this disclosure, transform and store unit 26 may be configured to store the value indicative of the scissor region without re-clearing scissor buffer 18. By not needing to re-clear scissor buffer 18, aspects of this disclosure may promote efficient processing.

Clip unit 28 may receive coordinates of one or more objects from host processor 4 (58). Clip unit 28 may also receive the value indicative of the scissor region from transform and store unit 26. Clip unit 28 may clip the objects based on the value indicative of the scissor region (60). For example, clip unit 28 may utilize the glTranslatef function to clip the objects. The variable for the glTranslatef function may be the z coordinate of the 3-D coordinates or 4-D coordinates, which may be substantially the same as the assigned numerical identifier.

Clip unit 28 may discard objects or portions of objects that reside outside the scissor region. For the objects or portions of objects that reside within the scissor region, clip unit 28 may transmit the coordinates of the objects or portions of objects, as well as pixel values to various other units of GPU 6 to perform additional pixel processing. For example, vertex shader unit 30, primitive assembler/processing unit 32, scan converter unit 34, early depth test unit 36, shader filter and texture unit 38, and blender unit 40 may perform additional pixel processing and store the processed pixels in color buffer 20 (62).

GPU 6 may then determine whether there are any more scissor regions (64). If there are more scissor regions (YES of 64), region receiver unit 25 may receive the coordinates for the next scissor region (50). In example aspects of this disclosure, GPU 6 may receive the coordinates for the next scissor region, and perform clipping relative to the next scissor region without re-clearing scissor buffer 18. If there are no more scissor regions (NO of 64), GPU 6 may render the pixels on display 8 (64).

In one or more examples, the functions described may be implemented in hardware, software executed on hardware, firmware executed on hardware, or any combination thereof. In some examples, instructions stored on a computer-readable media may cause the hardware components to perform their respective functions described above. The computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Combinations of the above should also be included within the scope of computer-readable media.

The code may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined by a collection of interoperative hardware units, including one or more processors as described above, in conjunction with suitable software and/or firmware.

Various examples have been described. These and other examples are within the scope of the following claims.

The invention claimed is:

1. A method comprising:
receiving, with a graphics processing unit (GPU) that is configured to receive two dimensional (2-D) coordinates, 2-D coordinates of a scissor region;
transforming the 2-D coordinates of the scissor region into coordinates that include more than two dimensions to include a numerical identifier for the scissor region as one of the coordinates for the more than two dimensions;
storing the numerical identifier for the scissor region in one or more storage units of a scissor buffer based on the coordinates that include more than two dimensions;
receiving coordinates of one or more objects;
clipping the one or more objects based on the stored numerical identifier; and
rendering pixels of the clipped one or more objects.

2. The method of claim 1, wherein transforming the 2-D coordinates of the scissor region into coordinates that include more than two dimensions comprises transforming the 2-D coordinates of the scissor region into at least one of 3-D coordinates and 4-D coordinates.

3. The method of claim 2, wherein transforming the 2-D coordinates of the scissor region into the 3-D coordinates comprises multiplying the 2-D coordinates of the scissor region with a 3-D transform matrix.

4. The method of claim 3, wherein the 3-D transform matrix comprises $$\begin{bmatrix} 1 & 0 & 0 \\ 0 & 1 & 0 \\ 0 & 0 & i \end{bmatrix},$$

and wherein i equals the numerical identifier of the scissor region.

5. The method of claim 2, wherein transforming the 2-D coordinates of the scissor region into the 4-D coordinates comprises multiplying the 2-D coordinates of the scissor region with a 4-D transform matrix.

6. The method of claim 5, wherein the 4-D transform matrix comprises $$\begin{bmatrix} 1 & 0 & 0 & 0 \\ 0 & 1 & 0 & 0 \\ 0 & 0 & 1 & i \\ 0 & 0 & 0 & 1 \end{bmatrix},$$

and wherein i equals the numerical identifier of the scissor region.

7. The method of claim 1, further comprising assigning the numerical identifier to the scissor region.

8. The method of claim 1, further comprising initially clearing the scissor buffer, wherein storing the numerical identifier for the scissor region in one or more storage units of a scissor buffer comprises storing the numerical identifier for the scissor region in the one or more storage units of the scissor buffer without re-clearing the scissor buffer.

9. The method of claim 1, wherein the scissor region comprises a first scissor region, and wherein the one or more storage units comprise a first set of storage units, the method further comprising:
receiving 2-D coordinates of a second scissor region;
transforming the 2-D coordinates of the second scissor region into at least one of 3-D coordinates and 4-D coordinates, wherein one of the coordinates of the at least one of the 3-D coordinates and the 4-D coordinates includes a numerical identifier for the second scissor region; and
storing the numerical identifier for the second scissor region in a second set of storage units of the scissor buffer without clearing the scissor buffer based on at least one of the 3-D coordinates and 4-D coordinates.

10. The method of claim 1, wherein the 2-D coordinates of the scissor region comprise 2-D coordinates for each vertex of the scissor region.

11. An apparatus comprising:
a scissor buffer;
a first unit configured to receive two dimensional (2-D) coordinates of a scissor region, wherein the first unit is configured to receive 2-D coordinates; and
a second unit configured to:
transform the 2-D coordinates of the scissor region into coordinates that include more than two dimensions to include a numerical identifier for the scissor region as one of the coordinates for the more than two dimensions;
store the numerical identifier for the scissor region in one or more storage units of the scissor buffer based on the coordinates that include more than two dimensions;
receive coordinates of one or more objects;
clip the one or more objects based on the stored numerical identifier; and
render pixels of the clipped one or more objects,
wherein at least one of the first unit and the second unit is formed at least partially in hardware.

12. The apparatus of claim 11, wherein the first unit comprises a region retriever unit, and the second unit comprises a transform and store unit.

13. The apparatus of claim 11, further comprising a graphics processing unit (GPU), wherein the GPU includes the first and second units.

14. The apparatus of claim 11, further comprising a host processor configured to transmit the 2-D coordinates of the scissor region to the first unit.

15. The apparatus of claim 11, wherein the second unit is configured to transform the 2-D coordinates of the scissor region into at least one of 3-D coordinates and 4-coordinates to transform the 2-D coordinates into the coordinates that include more than two dimensions.

16. The apparatus of claim 15, wherein second unit is configured to multiply the 2-D coordinates of the scissor region with a 3-D transform matrix to transform the 2-D coordinates into the 3-D coordinates.

17. The apparatus of claim 16, wherein the 3-D transform matrix comprises $$\begin{bmatrix} 1 & 0 & 0 \\ 0 & 1 & 0 \\ 0 & 0 & i \end{bmatrix},$$

and wherein i equals the numerical identifier of the scissor region.

18. The apparatus of claim 15, wherein second unit is configured to multiply the 2-D coordinates of the scissor region with a 4-D transform matrix to transform the 2-D coordinates into the 4-D coordinates.

19. The apparatus of claim 18, wherein the 4-D transform matrix comprises $$\begin{bmatrix} 1 & 0 & 0 & 0 \\ 0 & 1 & 0 & 0 \\ 0 & 0 & 1 & i \\ 0 & 0 & 0 & 1 \end{bmatrix},$$

and wherein i equals the numerical identifier of the scissor region.

20. The apparatus of claim 11, wherein the first unit is further configured to assign the numerical identifier to the scissor region.

21. The apparatus of claim 11, further comprising a graphics processing unit (GPU) configured to initially clear the scissor buffer, wherein the second unit is configured to store the numerical identifier for the scissor region without the GPU re-clearing the scissor buffer.

22. The apparatus of claim 11,
wherein the scissor region comprises a first scissor region,
wherein the one or more storage units comprise a first set of storage units,
wherein the first unit is further configured to receive 2-D coordinates of a second scissor region,
wherein the second unit is further configured to:
transform the 2-D coordinates of the second scissor region into at least one of 3-D coordinates and 4-D coordinates, wherein one of the coordinates of the at least one of the 3-D coordinates and the 4-D coordinates includes a numerical identifier for the second scissor region; and
store the numerical identifier for the second scissor region in a second set of storage units of the scissor buffer without clearing the scissor buffer.

23. The apparatus of claim 11, wherein the 2-D coordinates of the scissor region comprise 2-D coordinates of each vertex of the scissor region.

24. An apparatus comprising:
means for receiving two dimensional (2-D) coordinates of a scissor region, wherein the means for receiving is configured to receive 2-D coordinates;
means for transforming the 2-D coordinates of the scissor region into coordinates that include more than two dimensions to include a numerical identifier for the scissor region as one of the coordinates for the more than two dimensions;
means for storing the numerical identifier for the scissor region in one or more storage units of a scissor buffer based on the coordinates that include more than two dimensions;
means for receiving coordinates of one or more objects;
means for clipping the one or more objects based on the stored numerical identifier; and
means for rendering pixels of the clipped one or more objects,
wherein at least one of the means for receiving, transforming, and storing is implemented at least partially in hardware.

25. The apparatus of claim 24, wherein the means for transforming the 2-D coordinates of the scissor region into coordinates that include more than two dimensions comprises means for transforming the 2-D coordinates of the scissor region into at least one of 3-D coordinates and 4-D coordinates.

26. The apparatus of claim 25, wherein the means for transforming the 2-D coordinates of the scissor region into the 3-D coordinates comprises means for multiplying the 2-D coordinates of the scissor region with a 3-D transform matrix.

27. The apparatus of claim 26, wherein the 3-D transform matrix comprises $$\begin{bmatrix} 1 & 0 & 0 \\ 0 & 1 & 0 \\ 0 & 0 & i \end{bmatrix},$$

and wherein i equals the numerical identifier of the scissor region.

28. The apparatus of claim 25, wherein the means for transforming the 2-D coordinates of the scissor region into the 4-D coordinates comprises means for multiplying the 2-D coordinates of the scissor region with a 4-D transform matrix.

29. The apparatus of claim 28, wherein the 4-D transform matrix comprises $$\begin{bmatrix} 1 & 0 & 0 & 0 \\ 0 & 1 & 0 & 0 \\ 0 & 0 & 1 & i \\ 0 & 0 & 0 & 1 \end{bmatrix},$$

and wherein i equals the numerical identifier of the scissor region.

30. The apparatus of claim 24, further comprising means for assigning the numerical identifier to the scissor region.

31. The apparatus of claim 24, further comprising means for initially clearing the scissor buffer, wherein the means for storing the numerical identifier for the scissor region in one or more storage units of a scissor buffer comprises means for storing the numerical identifier for the scissor region in the one or more storage units of the scissor buffer without re-clearing the scissor buffer.

32. The apparatus of claim 24, wherein the scissor region comprises a first scissor region, and wherein the one or more storage units comprise a first set of storage units, the apparatus further comprising:
  means for receiving 2-D coordinates of a second scissor region;
  means for transforming the 2-D coordinates of the second scissor region into at least one of 3-D coordinates and 4-D coordinates, wherein one of the coordinates of the at least one of the 3-D coordinates and the 4-D coordinates includes a numerical identifier for the second scissor region; and
  means for storing the numerical identifier for the second scissor region in a second set of storage units of the scissor buffer without clearing the scissor buffer.

33. The apparatus of claim 24, wherein the 2-D coordinates of the scissor region comprise 2-D coordinates for each vertex of the scissor region.

34. A non-transitory computer-readable storage medium comprising instructions that cause one or more processors, upon reception of two dimensional (2-D) coordinates of a scissor region, to:
  transform the 2-D coordinates of the scissor region into coordinates that include more than two dimensions to include a numerical identifier for the scissor region as one of the coordinates for the more than two dimensions;
  store the numerical identifier for the scissor region in one or more storage units of a scissor buffer based on the coordinates that include more than two dimensions;
  receive coordinates of one or more objects;
  clip the one or more objects based on the stored numerical identifier; and
  render pixels of the clipped one or more objects,
  wherein the one or more processors are configured to receive only 2-D coordinates.

35. The computer-readable storage medium of claim 34, wherein the instructions that cause the one or more processors to transform the 2-D coordinates of the scissor region into coordinates that include more than two dimensions comprise instructions that cause the one or more processors to transform the 2-D coordinates of the scissor region into at least one of 3-D coordinates and 4-D coordinates.

36. The computer-readable storage medium of claim 35, wherein the instructions that cause the one or more processors to transform the 2-D coordinates of the scissor region into the 3-D coordinates comprise instructions that cause the one or more processors to multiply the 2-D coordinates of the scissor region with a 3-D transform matrix.

37. The computer-readable storage medium of claim 36, wherein the 3-D transform matrix comprises $$\begin{bmatrix} 1 & 0 & 0 \\ 0 & 1 & 0 \\ 0 & 0 & i \end{bmatrix},$$

and wherein i equals the numerical identifier of the scissor region.

38. The computer-readable storage medium of claim 35, wherein the instructions that cause the one or more processors to transform the 2-D coordinates of the scissor region into the 4-D coordinates comprise instructions that cause the one or more processors to multiply the 2-D coordinates of the scissor region with a 4-D transform matrix.

39. The computer-readable storage medium of claim 38, wherein the 4-D transform matrix comprises $$\begin{bmatrix} 1 & 0 & 0 & 0 \\ 0 & 1 & 0 & 0 \\ 0 & 0 & 1 & i \\ 0 & 0 & 0 & 1 \end{bmatrix},$$

and wherein i equals the numerical identifier of the scissor region.

40. The computer-readable storage medium of claim 34, further comprising instructions that cause the one or more processors to assign the numerical identifier to the scissor region.

41. The computer-readable storage medium of claim 34, further comprising instructions that cause the one or more processors to initially clear the scissor buffer, wherein the instructions that cause the one or more processors to store the numerical identifier for the scissor region in one or more storage units of a scissor buffer comprise instructions that cause the one or more processors to store the numerical identifier for the scissor region in the one or more storage units of the scissor buffer without re-clearing the scissor buffer.

42. The computer-readable storage medium of claim 34, wherein the scissor region comprises a first scissor region, and wherein the one or more storage units comprise a first set of storage units, the computer-readable storage medium comprising further instructions that cause the one or more processors to:
  receive 2-D coordinates of a second scissor region;
  transform the 2-D coordinates of the second scissor region into at least one of 3-D coordinates and 4-D coordinates, wherein one of the coordinates of the at least one of the 3-D coordinates and the 4-D coordinates includes a numerical identifier for the second scissor region; and
  store the numerical identifier for the second scissor region in a second set of storage units of the scissor buffer without clearing the scissor buffer.

43. The computer-readable storage medium of claim 34, wherein the 2-D coordinates of the scissor region comprise 2-D coordinates for each vertex of the scissor region.

* * * * *